United States Patent
Steen et al.

(10) Patent No.: US 7,561,952 B2
(45) Date of Patent: Jul. 14, 2009

(54) MOTOR VEHICLE HAVING AN AUTOMATED TRANSMISSION

(75) Inventors: Marcus Steen, Angered (SE); Anders Eriksson, Gothenburg (SE)

(73) Assignee: Volvo Lastvagnar AB, Gothenburg (SE)

(*) Notice: Subject to any disclaimer, the term of this patent is extended or adjusted under 35 U.S.C. 154(b) by 439 days.

(21) Appl. No.: 10/514,478

(22) PCT Filed: May 8, 2003

(86) PCT No.: PCT/SE03/00744

§ 371 (c)(1),
(2), (4) Date: Nov. 3, 2005

(87) PCT Pub. No.: WO03/097400

PCT Pub. Date: Nov. 27, 2003

(65) Prior Publication Data

US 2006/0089774 A1    Apr. 27, 2006

(30) Foreign Application Priority Data

May 16, 2002   (SE) .................................... 0201477

(51) Int. Cl.
*G09B 9/00* (2006.01)
(52) U.S. Cl. .......................................... 701/54; 74/333
(58) Field of Classification Search .................. 701/51, 701/101–102, 54; 74/333, 335, 336 R, 359; 477/110–111, 37, 44, 63
See application file for complete search history.

(56) References Cited

U.S. PATENT DOCUMENTS

| | | | |
|---|---|---|---|
| 4,821,190 A | | 4/1989 | Patil |
| 5,526,261 A | * | 6/1996 | Kallis et al. ................... 701/51 |
| 5,832,400 A | | 11/1998 | Takahashi et al. |
| 5,931,886 A | * | 8/1999 | Moroto et al. ................ 701/54 |
| 6,054,776 A | * | 4/2000 | Sumi ........................... 290/17 |
| 6,287,237 B1 | * | 9/2001 | Graf et al. ..................... 477/94 |
| 6,629,026 B1 | * | 9/2003 | Baraszu et al. ................ 701/22 |
| 6,671,601 B2 | * | 12/2003 | Abiru .......................... 701/51 |
| 2002/0042326 A1 | | 4/2002 | Rosi et al. |

\* cited by examiner

*Primary Examiner*—Dalena Tran
(74) *Attorney, Agent, or Firm*—Young & Thompson

(57) ABSTRACT

A motor vehicle with a clutch (3) and an automated transmission (9) between the engine and the drive wheels of the vehicle. The vehicle has control elements (45,48) for engine function and transmission function depending on a set position of an electronic gear selector (46). The control elements, with the gear selector in its position for automatic shifting, selects a gear for starting off or under way, which is determined by the gear selection strategy stored in the control means as a function of various parameters fed into the control elements. The control elements, are arranged to perform, firstly, a simulation process related to the gear selection strategy with at least one alternative set of parameters (U2-UN) and, secondly; a comparative analysis based on a first set of control parameters (U1).

17 Claims, 7 Drawing Sheets

MOTOR VEHICLE HAVING AN AUTOMATED TRANSMISSION

Figure 1:
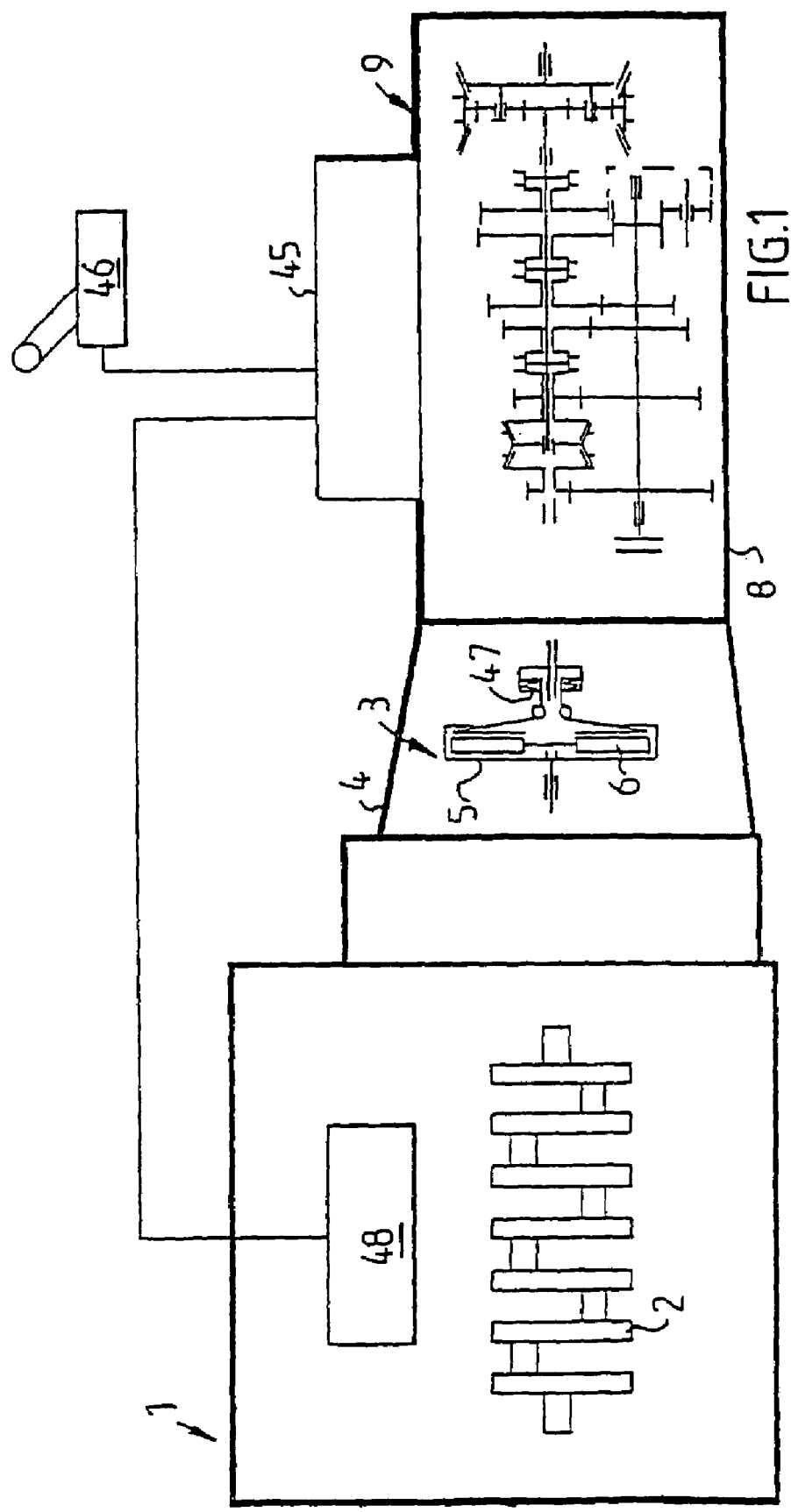

The present invention relates to a motor vehicle with a clutch and automated transmission between the engine and the drive wheels of the vehicle, comprising control means with an engine control function and a transmission control function for controlling the transmission in accordance with a selected position for a manual gear selector, where the control means with the gear selector in its position for automatic shifting, when starting off or under way, selects a gear which is determined by a gear selection strategy, stored in said control means, as a function of parameters fed into the control means.

In vehicles of this type there are today control units with a stored gear selector strategy, i.e. a time-based shifting sequence as a function of road incline, for example. A known technology is described in U.S. Pat. No. 5,832,400. For vehicles with a conventional automatic transmission, where the transmission shifts sequentially with a torque converter, there is a gear selection strategy based on an algorithm which takes into account a measuring point in the topology surrounding the vehicle with instantaneous vehicle position as a reference point. By determining, by various methods, where the vehicle will be after a certain time interval, it is possible to modify the engine setting and the shifting points for the automatic transmission, i.e. at which rpm the transmission should shift up or down. Possible variants could be to use electronic maps together with a positioning system (e.g. a Global Positioning System, GPS) or extrapolate a future position for the vehicle. One disadvantage of this system is that it does not take into consideration how the road varies in elevation between two-points of measurement, and extreme points (e.g. the crest of a hill) between the two points of measurement are thus not taken into account in certain cases. The engine and the transmission are set in accordance with the known technology, on the basis of how great the difference in elevation is between the two points of measurement, and the instantaneous throttle position. Throttle position means in this case and in the following text both an adjustable cruise control and an accelerator pedal.

U.S. Pat. No. 5,832,400 only takes into consideration, as was mentioned, a single point of measurement during a certain time or distance into the future, in order to see if the instantaneous engine torque will be sufficient, or if the engine and/or transmission needs to be reset. It is also described how a plurality of points of measurement can be used but in that case a mean value thereof is used, thus providing one value for the required driving force. With a transmission which is shifted sequentially and with the method just described, there is an uncertainty in the system which results in tangible consequences in the form of less than satisfactory cruise control function, uneven acceleration and unnecessarily large exhaust emissions.

Today there are also motor vehicles of the type described by way of introduction, which do not compromise with a limited gear selection strategy, but rather reach a decision on drive chain gear ratio on a much better basis, taking the future into account. The control unit is then arranged, on the basis of fed in parameters, and thus at least with knowledge of road incline and throttle control position, but also engine, turbo and transmission characteristics, in accordance with a gear selection strategy based on a number of computer simulations, to select a gear chain total ratio, which, according to the simulation, is optimum for a given stretch of road. This is based on a criterion selected either automatically or semi-automatically by the driver. It can also be selected externally either automatically or semi-automatically.

Disadvantages with today's known technology are that the parameters or criteria fed in manually by the driver or externally, automatically or semi-automatically, can be erroneous, due to human negligence or for other reasons. A simulated, instantaneous or future optimal gear selection or gear shift schedule for the vehicle will then be based on incorrect input, and consequently the optimal gear selection will in that case only appear to be the best.

The purpose of the present invention is to achieve a motor vehicle of the type described by way of introduction, which avoids the above mentioned problems by providing a system which makes it possible to indicate if there is a better optimisation of the gear selection and/or the gear selection schedule.

This is achieved according to the invention by virtue of the fact that the control means is adapted to perform, on the one hand, a simulation process related to a gear selection strategy with at least one alternative set of parameters (U2-UN) and, on the other hand, a comparative analysis based on a first set of parameters (U1).

This makes possible checking of set control parameters and the possibility of monitoring settings becomes a practical reality. Feed-in errors can be detected, indicated and remedied. Furthermore, the comparative analysis can be a good basis for the work of developing the gear selection strategy making possible optimal setting of the weighting of the control parameters or the setting schedule with regard to a given stretch of road.

The control means are disposed, under set preconditions, to lay out a shifting schedule with automatic gear selection for a longer period forward (30 seconds or more), where the information on instantaneous position is obtained with the aid of GPS and future positions are provided by information from an electronic map. Said information is intended to be fed into said control means and form the basis for different simulations. The driver can himself select the criterion for driving, i.e. choose the relative weights of the controlling parameters. Controlling parameters include emissions (both exhaust and noise), average speed or fuel consumption. If the driver, for example, prefers an optimized, economical driving model with low fuel consumption, the first weight is given to fuel consumption and the computer simulation will produce, for the given control parameter weighting, the most energy-saving shifting schedule. Furthermore, compromise solutions can be selected by giving the desired weightings for the respective control parameters. In order to provide additional precision in the simulation result, consideration is taken to the individual variations of the individual engine, since emissions from the engine can be measured when driving in various driving situations and these can be taken into consideration for future engine settings. Settings for the engine, for example, can vary along an imagined road picture, which the simulation is made for, in contrast to the known technology, where the engine setting has only two positions between an instantaneous position and a future position. The engine model is also important for providing information on engine exhaust emissions at various transients. Present known technology does not facilitate taking this into account. And shifting in the gearbox does not need to be done sequentially. The computer also simulates shifting sequences where one or more gears are skipped.

Known technology, which uses GPS and electronic maps, can make simulations which are valid relatively far into the future, but the risk of something unforeseen, i.e. about which information cannot be gotten from the electronic map, will consequently increase. The system has a sensibility, which, with the aid of extrapolation of the throttle opening position, can to a certain extent estimate in what position the throttle opening will be in a few seconds and how rapidly it is expected to move towards that position. This means that the system can adjust to a new situation earlier than known systems, which only consider the instantaneous throttle opening position.

Furthermore, with the aid of electronics and sensors, estimates (extrapolations) can be made concerning road incline and information can thus be obtained on the topology surrounding the vehicle and its future position. It is possible according to the present invention, to use information on surrounding vehicles, in order to be able to obtain a lower fuel consumption in a situation, for example, where one will catch up to a vehicle driving in front.

The present invention is preferably intended for, but is not limited to, automated manual transmissions. Compared with shifting with force interruption it is an advantage to use automated manual transmissions (Automated Power Transmissions). It is possible using the system according to the invention, particularly with the integrated shifting strategy described herein, to make sure that shifting up in an uphill incline will be successful where it might otherwise be problematic if the shifting takes too long with the vehicle retarding too much, especially a tractor vehicle with a heavy load.

In the above description and in the following, it is stated that the various signals are fed into the second control unit, which carries out the computer simulations. This function can, of course, also be taken over by the first control unit or in another physical location arranged for communication with the second control unit.

Figure 2:
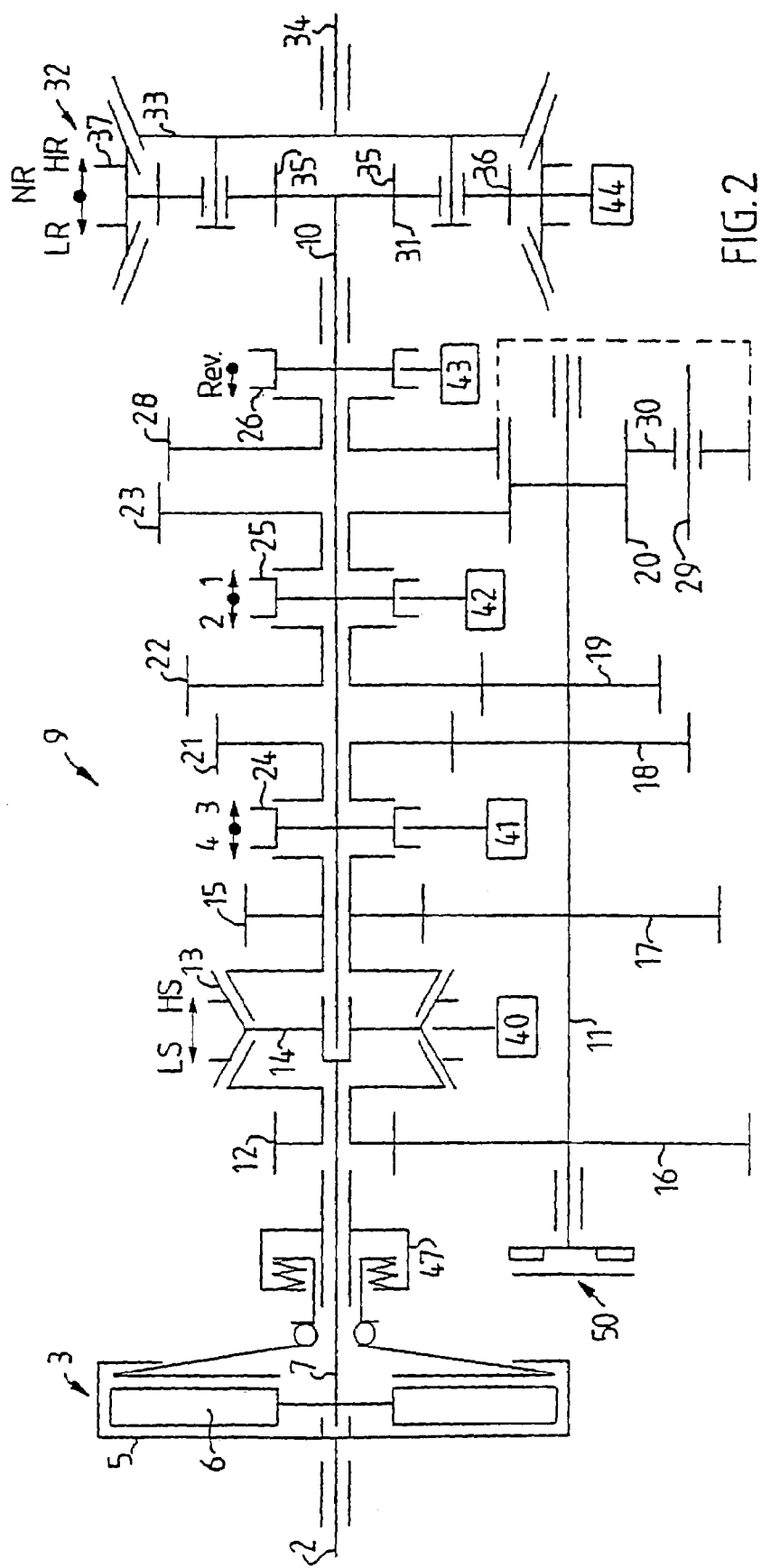
Figure 3:
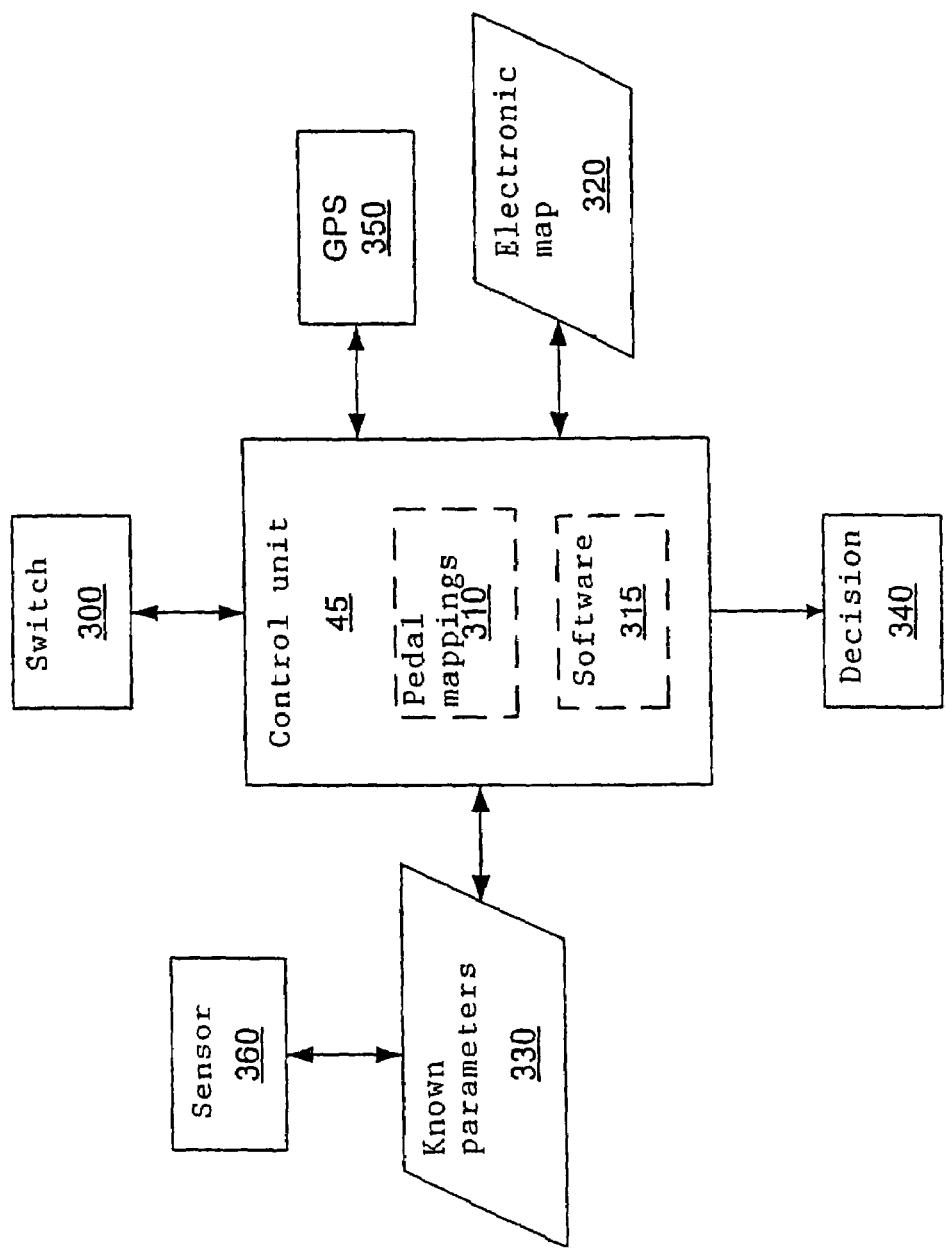
Figure 4:
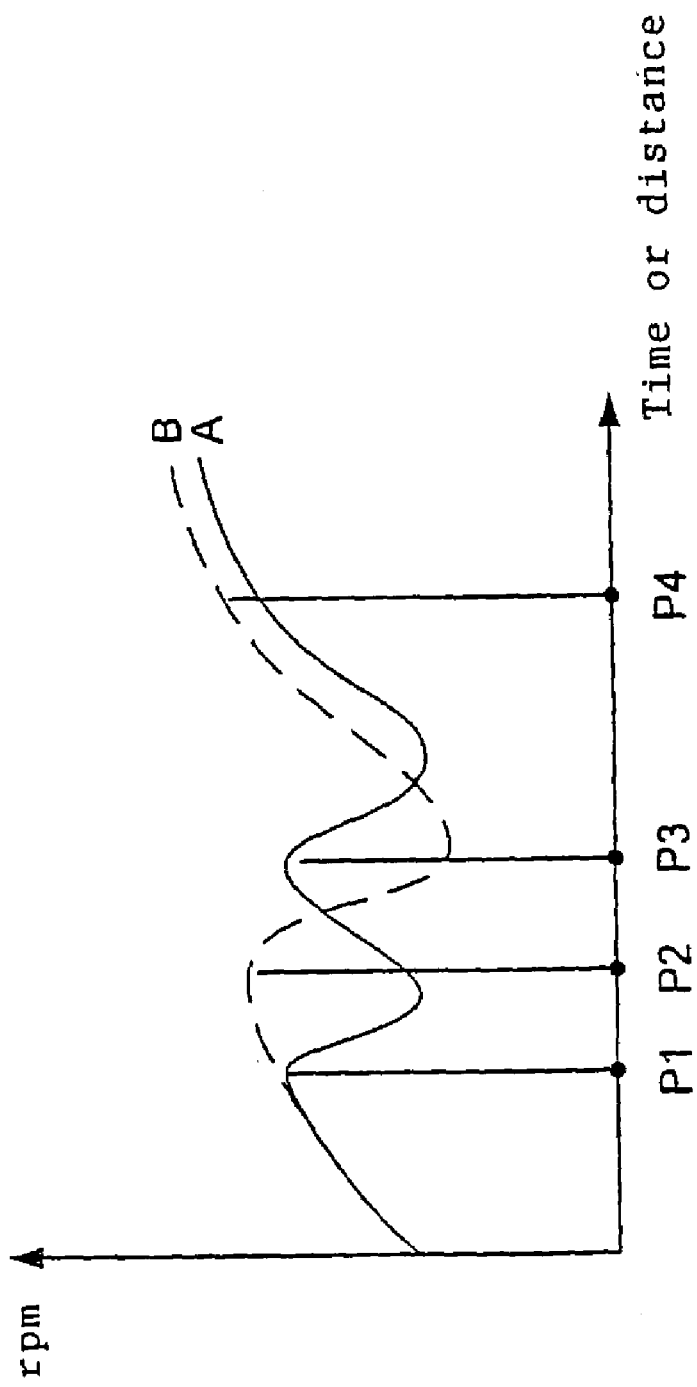
Figure 5:
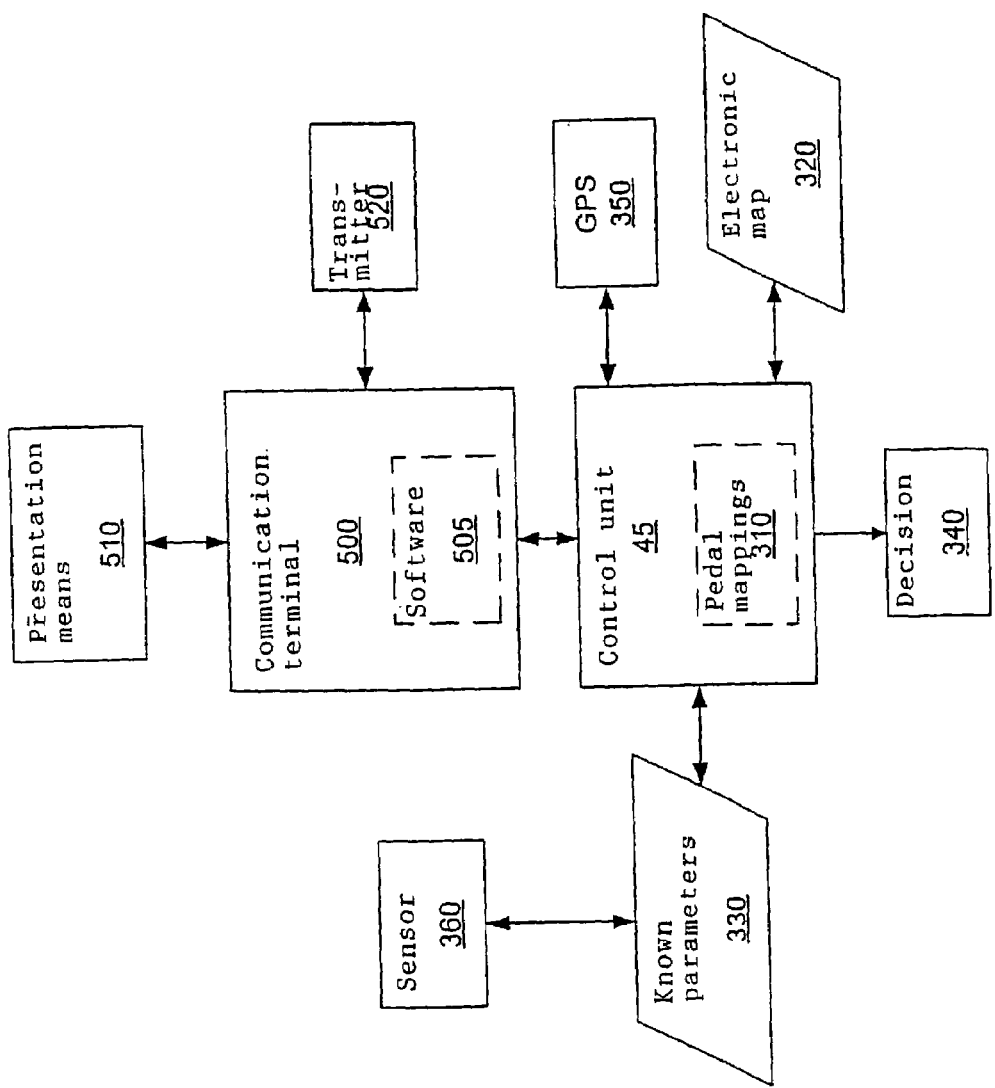
Figure 6:
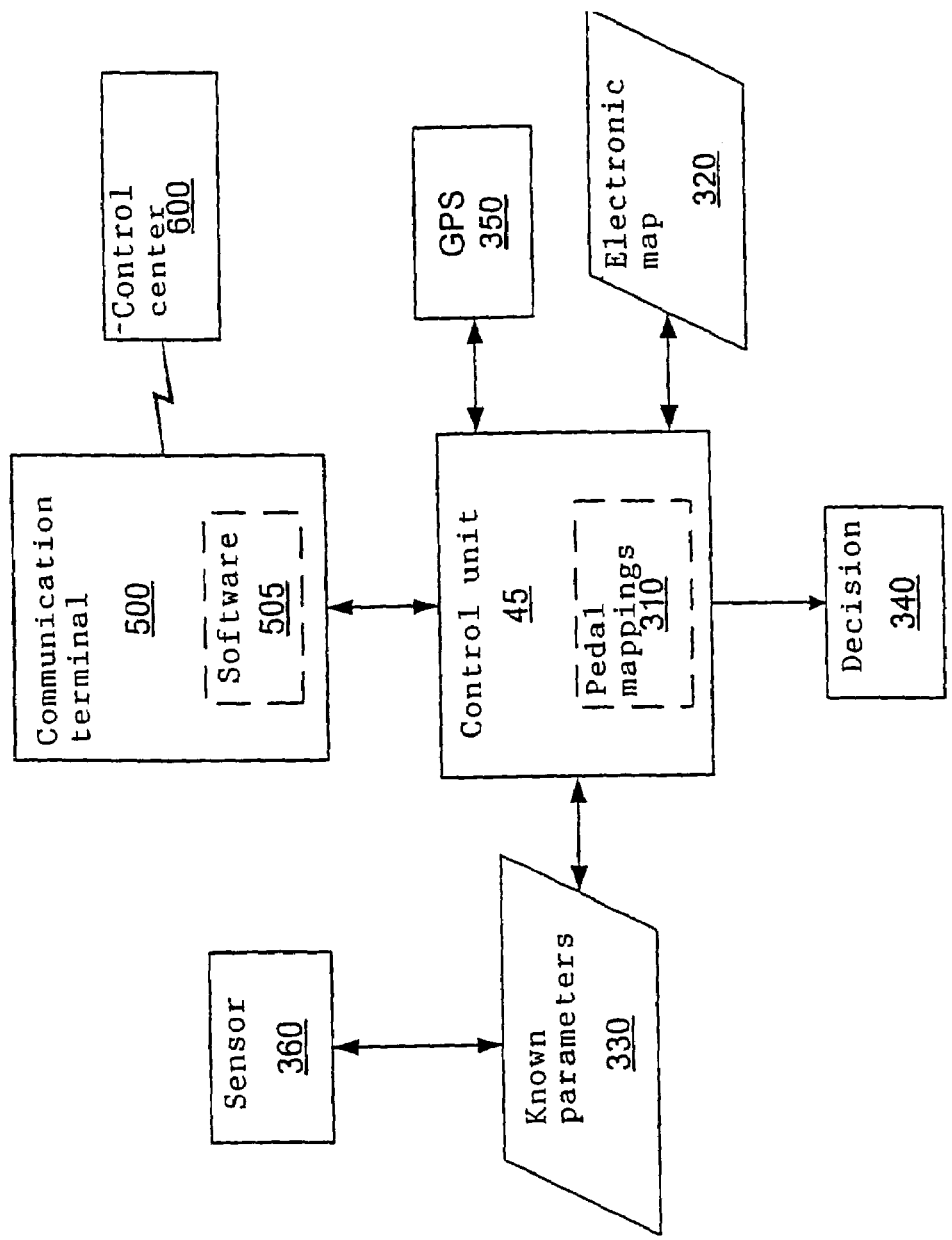
Figure 7:
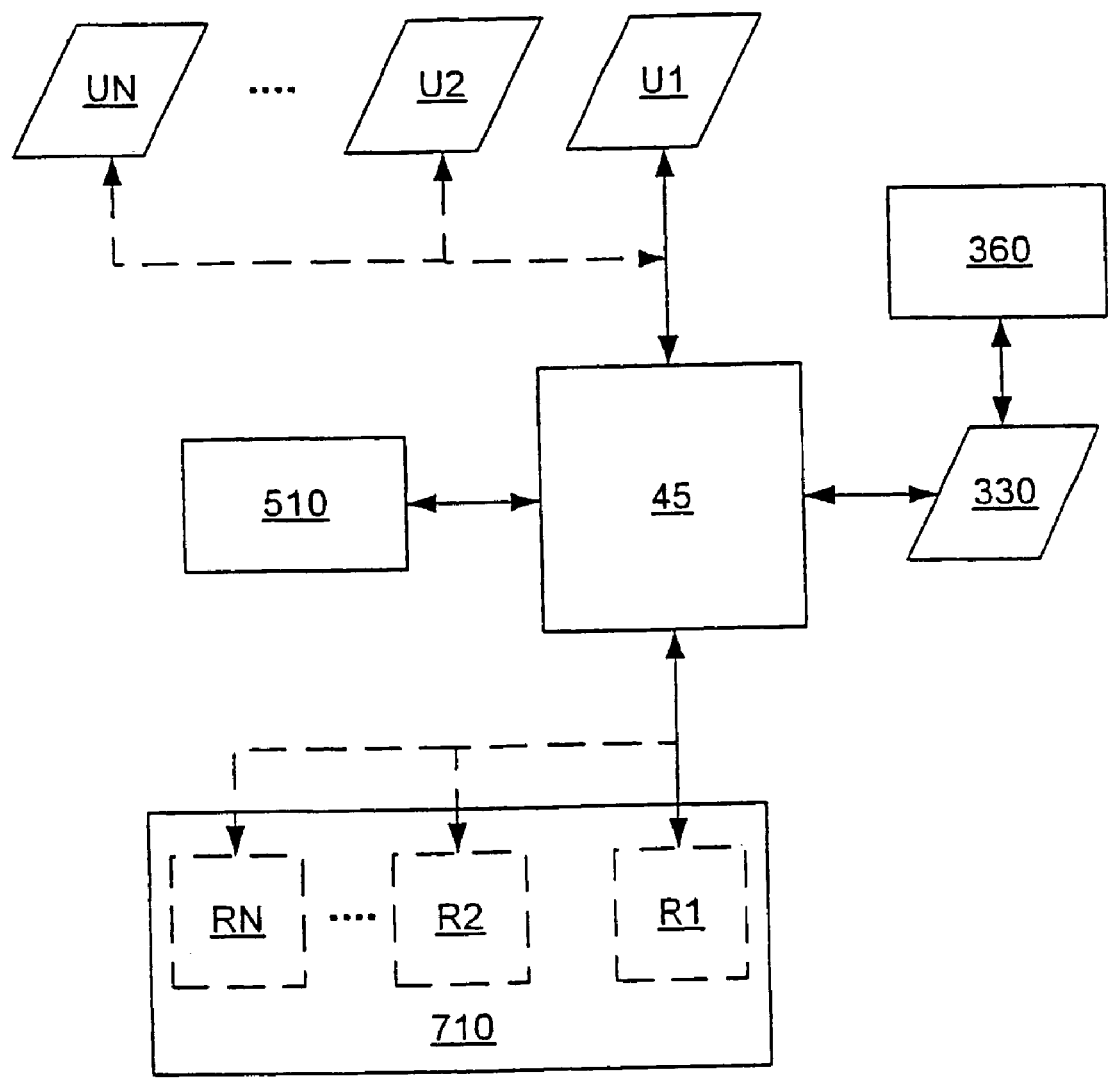

The invention will be described in more detail below with reference to examples shown in the accompanying drawings, where FIG. 1 shows a schematic representation of one embodiment of a drive unit according to the invention, FIG. 2 shows the clutch and the gearbox in FIG. 1 on a larger scale, and FIG. 3 shows an overview of inputs into the second control unit, FIG. 4 exemplifies parts of a simple computer simulation, FIG. 5 illustrates an alternative overview of input signals to the second control unit for control parameters which are fed in from a communication terminal to a transmission control unit, FIG. 6 shows a variant of the overview in FIG. 5 and FIG. 7 illustrates at least two embodiments, according to the present invention, of a simulation process relevant from the perspective of control, monitoring, optimisation and development.

In FIG. 1, 1 designates a six-cylinder internal combustion engine, e.g. a diesel engine, the crankshaft 2 of which is coupled to a single-plate dry disk clutch which is designated generally by reference number 3 and is enclosed in a clutch case 4. Instead of a single-plate disk clutch, a dual disk clutch can be used. The crankshaft 2 is connected non-rotatably to the clutch housing 5 of the clutch 3, while its disk plate 6 is connected non-rotatably to an input shaft 7 (FIG. 2), which is mounted rotatably in the casing 8 of a gearbox designated generally by reference number 9. A main shaft 10 (FIG. 2) and an intermediate shaft 11 (FIG. 2) are also mounted rotatably in the casing 8. Further, there are illustrated a first control unit 48 for controlling the engine, a second control unit for controlling the transmission and a manual gear-speed selector 46, coupled to the second control unit 45. The first and second control units (48 and 45, respectively) are adapted for communication with each other.

As can be seen most clearly from FIG. 2, a gear wheel 12 is mounted rotatably on the input shaft 7 and is lockable on the shaft by means of an engaging sleeve 13 which is provided with synchronizing means and is mounted non-rotatably but axially displaceably on a hub 14 connected non-rotatably to the input shaft 7. By means of the engaging sleeve 13, a gear wheel 15 mounted rotatably on the main shaft 10 is also lockable relative to the input shaft 7. The gear wheels 12 and 15 engage with gear wheels 16 and 17, respectively, which are connected non-rotatably to the intermediate shaft 11. Arranged in a rotationally fixed manner on the intermediate shaft 11 are further gear wheels 18, 19 and 20 which engage with gear wheels 21, 22 and 23, respectively, which are mounted rotatably on the main shaft 10 and are lockable on the main shaft by means of engaging sleeves 24 and 25, respectively, which, in the illustrative embodiment shown, do not have synchronizing arrangements. A further gear wheel 28 is mounted rotatably on the main shaft 10 and engages with an intermediate gear wheel 30, which is mounted rotatably on a separate shaft 29 and engages in turn the intermediate shaft gear wheel 20. The gear wheel 28 is lockable on its shaft by means of an engaging sleeve 26.

The gear wheel pairs 12, 16 and 15, 17 and also the engaging sleeve 13 form a split gearing with a low gear stage LS and a high gear stage HS. The gear wheel pair 15, 17 also forms, together with the gear wheel pairs 21, 18, 22, 19, 23, 20 and 28, 30, a basic gearbox with four forward gears and one reverse gear. Arranged in a rotationally fixed manner on the output end of the main shaft is a gear wheel 31 which forms the sun gear in a two-stage range gear of the planetary type designated by reference number 32, the planet wheel carrier 33 of which is connected in a rotationally fixed manner to a shaft 34 which forms the output shaft of the gearbox. The planet wheels 35 of the range gear 32 engage with a ring gear 36, which, by means of an engaging sleeve 37, is lockable relative to the gearbox casing 8 (FIG. 1) for low range LR and relative to the planet wheel carrier 33 for high range HR. The engaging sleeve also has a neutral position NR between the gear positions LR and HR. In the neutral position NR the output shaft 34 is released from the main shaft 10.

The engaging sleeves 13, 24, 25, 26 and 37 are displaceable as shown by the arrows in FIG. 2, to provide the gear stages shown next to the arrows. The displacement is brought about by servo devices 40, 41, 42, 43 and 44 which are indicated diagrammatically in FIG. 2 and may be pneumatically operated piston/cylinder arrangements of the type used in a gearbox of the type described above, which is marketed under the name Geartronic®. The servo devices are controlled by an electronic control unit 45 (FIG. 1), comprising a microcomputer, depending on signals fed into the control unit representing the various engine and vehicle data which comprise at least engine speed, vehicle speed, clutch pedal and throttle position and, in certain cases, engine brake on/off, when an electronic gear selector 46 coupled to the control unit 45 (FIG. 1) is in its automatic transmission position. When the selector is in the position for manual shifting, shifting is effected via the gear selector 46 (FIG. 1) at the command of the driver. The control unit 45 (FIG. 1) also controls fuel injection, that is to say the engine speed and/or engine torque, depending on the throttle pedal position, and also the air supply to a pneumatic piston/cylinder arrangement 47, by means of which the clutch 3 is engaged and disengaged.

The control unit 45 is programmed in a known manner so that it keeps the clutch 3 engaged when the vehicle is standing still and the gear selector 46 is in the neutral position. This means that the engine drives the input shaft 7 and thus also the intermediate shaft, while the output shaft 34 is disengaged. An auxiliary unit, e.g. an oil pump for lubricating the gearbox, can possibly be driven by the intermediate shaft in this position. The control unit 45 is also programmed, when the vehicle is standing still and the gear selector is moved from the neutral position to a shift position, either to a position for automatic shifting or to a position with a start-off gear selected by the driver, to first release the clutch 3, then brake the intermediate shaft 11 to stop with the aid of the intermediate shaft brake 50, indicated in FIG. 2, which can be a brake device, which can be known per se, controlled by the control unit 45. With the intermediate shaft 11 braked to stop or at least nearly to stop, the control unit 45 now initiates the shift in the basic gearbox to a gear ratio which is provided by the automatic shifter or selected by the driver. When the driver, after engaging the gear, opens the throttle, the accelerator pedal functions as a reverse clutch pedal, which, via the control unit, gradually increases the clutch engagement with increasing throttle opening.

FIG. 3 illustrates schematically input which the second control unit 45 needs to be able to generate a computer simulation. With one control 300 for manual or automatic control parameter weighting, providing a driving criterion selected by the driver, the simulation can be controlled in the present invention. The driver can select to prioritize, for example, low fuel consumption (for economical driving, for example), constant vehicle speed (for rapid driving at high average speed, for example), a certain level of emissions (for environmentally friendly driving) or a combination (weighting) of said control parameters. For automatic control parameter weighting, a model stored in the second control unit is used, which takes into consideration various parameters, such as throttle opening position, the mass of the vehicle and resistance to travel. The weighting of the control parameters, is different for different gear speeds. For example, low fuel consumption has high priority for high gears, and a heavy vehicle driving uphill has a high weighting for average speed. The switch 300 is adapted for communication with the second control unit 45. Pedal mappings 310, i.e. engine torque as a function of rpm for various throttle opening positions, are stored in the second control unit 45. An electronic map 320, for example stored on a CD-ROM (Compact Disc Read Only Memory) contains the information on a region's topology necessary for the computer simulation, i.e. at least gradients or elevation values for the route, with sea level as a reference, for example, and any information concerning speed limits along the route. The computer simulation uses parameters 330 sent from meters and sensors 360, in accordance with known technology. These consist at least of vehicle or train weight, instantaneous vehicle speed, gear ratios, degrees of efficiency, engine rpm, throttle opening position (even throttle opening position change), instantaneous position, road incline (not from electronic map), ambient temperature (which affects the fuel/air mixture), driving resistance and the engine dynamics of the engine. Driving resistance refers to a value computed by the second control unit in response to signals indicating instantaneous engine torque and instantaneous vehicle acceleration and mass, constituting an indication of road incline, any tailwind or headwind and the rolling resistance of the vehicle. Furthermore, consideration can also be taken to information on the speed of the preceding vehicle. In the second control unit 45, there are engine models including steady state torque, which is the torque, which the engine can deliver steadily at a given operational point, i.e. where so-called transients to get to the operational point have been left out. With the necessary information, the second control unit 45 can compute (simulate over a certain, predetermined time) i.e. fuel consumption, average speed and emissions (both exhaust and noise emissions), for a set of different gears and shifting schedules by solving equations with simulations and time increments. The best gear is selected by comparing computed fuel consumption, average speed and emissions or combinations of these, on the basis of a criterion selected by the driver, with matrices stored in the second control unit 45. Furthermore, FIG. 3 shows a symbol for GPS 350, which communicates with the second control unit, possibly also through the sensors 360. As an output from the second control unit 45, there is sent a decision 340, i.e. a gear selection.

FIG. 4 illustrates, in its most simple form, two simulated curves for a given traffic situation and a given vehicle state, i.e. where all of the parameters necessary for the computer simulation and the surrounding topology of the vehicle are known, two simulated curves. The figure shows how the engine rpm, when shifting, is dependent on time or distance.

The curve A (the solid line) represents a case after acceleration when shifting is effected at P1 from third gear to fourth gear. At the break in driving force after the shifting, the engine rpm drops but increases after a certain period again when the gear is engaged and acceleration takes over. The engine rpm once again increases and there is a new shifting from fourth gear to fifth gear at P3, whereafter the engine rpm again drops and increases again after a certain period. Curve B (the dashed line) represents another shifting sequence but for the same given traffic situation and vehicle state. In this case, a shifting at P2 from third gear directly to fifth gear is simulated. The result of such a shifting sequence will be, as according to the given example, that the latter case according to the simulation model will provide a higher rpm at P4. Estimated fuel consumption, emissions and the like are computed in this example for both cases. Depending on which engine rpm and which criterion for driving has been selected, a decision on the shifting schedule, to optimally fulfill the desired criterion, is made in the second control unit 45.

FIG. 5 illustrates an embodiment of the present invention where a communications terminal 500, adapted for communication with the second control unit 45, permanently or temporarily, has been coupled to the second control unit 45, to effect data transfer as per below.

The communications terminal 500 comprises a hardware module such as a PC (personal computer), a hand-held computer, PDA, or similar hand-held device. The communications terminal 500 can even be a mobile terminal, such as a mobile phone, which does not need to be physically connected to the communication terminal 500, but which is in its vicinity. The communication between the communications terminal 500 and the second control unit 45 thus also comprises wireless communication, such as for example infrared (IR) technology or radio technology (RF technology) e.g. Blue Tooth. One or more mechanisms can be coupled to the data transferred, particularly between the communication terminal 500 and the second control unit 45. For example, encryption, digital signature, access control, data integrity, authentication exchange, notarisation or the like can be employed for secure data transfer.

Furthermore, the communication terminal 500 is adapted for communication with presentation means 510, for example a GUI (Graphical User Interface), a printer, a monitor, a touch-screen, or the like.

Stored in the communication terminal 500 is software 505, compatible with software stored in the control unit 45. The software 505 makes possible the feeding in of weighted control parameters. In other words, automatic (either dynamically adapted to circumstances or predetermined) changes in the control parameters are made possible.

Two cases are evident, but these are by no means the only ones:

1. For one or more given stretches of road, there are one or more predetermined schedules for control parameters stored either in a memory in the communication terminal 500, or in a database (not shown) coupled thereto, or on a carrier such as a CD-ROM the data thereon being transferred to the communications terminal 500. Alternatively, programming can be done manually, to provide a setting schedule for the control parameter weighting in the communications terminal 500. The second control unit 45, coordinates and processes the set control parameter weighting with information on position (GPS 350), surrounding topology (electronic map 320) and from sensor 360, as well as known parameters 330, in a manner described previously in accordance with the present invention, to shift (or not shift), i.e. to make a decision 340. The difference in relation to the embodiment shown in FIG. 3 is thus an automation and time-advance weighting of the control parameters. The programming can of course also be effected while moving, e.g. if a change is necessary due to erroneous programming (re-programming), a route change (change of setting schedule) or the like.

2. The second case makes possible automatic, dynamic, control parameter weighting with external input. Transmitters 520 for this purpose, placed in the vehicle surroundings, e.g. along roads are adapted for communication with the communication terminal 500 send information on the current situation, and suitable or regulated control parameter weighting, to the communication terminal 500. Changes in the setting schedule for control parameter weighting are effected dynamically according to stored strategies. A transmitter, for example, can be placed at a city limit, and it sends, to the communication terminal 500, as the vehicle enters the city zone, a control parameter weighting in accordance with possible lower permissible levels for exhaust emissions for example. If priority is given to follow the control parameter weighting, the setting is changed thusly, possibly after manual confirmation via the communication terminal 500, and the vehicle can be automatically adapted to the new norms.

FIG. 6 illustrates an embodiment with central control. A control center 600, adapted for wireless communication with the communication terminal 500, can, in accordance with the present invention, give priority to economical driving (with low fuel consumption), a certain arrival time (weighting with regard to average speed) or certain emissions. The control center can be of the Fleet Management type, e.g. a coordinating center for a transport company. Communication can take place via a network medium, e.g. a tele-network or the internet using SMS, MMS, e-mail or another medium. Mechanisms mentioned in connection with FIG. 5 can also be coupled in here to provide secure transmission and implementation of information.

In this manner, a trucking company for example, or a municipal authority, can set, in the garage or on the road, the weighting of, or the maximum and/or minimum values of control parameters for exhaust emissions for example.

One advantage of this embodiment is that it facilitates adaptation to varying regional and local rules, norms, or laws. For example, prioritising low exhaust emissions can be easily programmed in and implemented in the model when entering an urban area with lower pennissible emission levels than outside.

Another advantage of this embodiment is that a vehicle originally delivered with settings for a certain environmental class can be updated to fulfill more or less stringent emission requirements, especially exhaust emission requirements.

If maximum or minimum values of control parameters should be set too high or too low in relation to the performance which the vehicle is capable of, and prescribed operational limits, such information can be indicated in performance means 510. Tailor made software can also provide all relevant information, such as whether recommended operational limits have been exceeded.

FIG. 7 illustrates schematically an embodiment where an example of a simulation process, in accordance with the present invention, makes possible continuous monitoring of the settings of the control parameter weighting and comparative analysis for alternative weighting settings for control parameters and notification of any erroneous indication of current settings or the setting schedule, e.g. in the presentation means 510, presented in accordance with a model stored in the control unit 45.

Setting errors in the weighting of the control parameters, set manually by the driver, e.g. with the control 300 (FIG. 3), or set externally, e.g. from the control center 600 via the communications terminal 500 (FIG. 6), can be detected by performing a number of parallel or serial simulations, preferably, but not necessarily, in real time with alternative settings of control parameter weighting.

As is shown schematically in FIG. 7, a simulation for a setting with a certain weighting setting U1 of control parameters in accordance with the process described above (e.g. in FIGS. 3 and 6). That is to say, to the control unit 45 there are transferred inter alia known parameters 330 from sensors 360, information from the electronic map 320 (not shown in the figure), information from GPS 350 (not shown in the figure), and simulations are performed continuously to reach a decision 340 (not shown in the figure).

The result of the simulation for U1 is labeled R1 in FIG. 7. R1 includes the decision 340 and all other conceivable relevant information, e.g. that measured by the sensor 360 or processed and computed by software 315 (not shown in figure) I the control unit 45, such as positional data, driver requests in the form of instantaneous acceleration, instantaneous and/or cumulative fuel consumption and various types of emissions or speed and comfort indications, all with or without time stamps.

The result R1 can preferably be electronically stored in a memory 710, and/or be implemented, i.e. effect a decision to shift or maintain status quo, and can be presented in a presentation means 510 (FIG. 5). The memory 710 is a memory of a known type, e.g. a hard drive, CD or the like, and can be physically located in the control unit 45 or in the communications terminal 500 or as an independent unit and is in any case adapted for communication with the control unit 45.

Parallel with the simulation for the set U1, a total of N sets of weighting parameters can be simulated continuously in real time in accordance with the described process and input (from for example 360, 350, 320). The results R2-RN for sets U2-UN are obtained substantially simultaneously with the result R1. In this example there are N results, R1-RN, the input of which only differs with regard to their weighting parameters. The results R1-RN can be processed with the aid software 315 stored in the control unit and can be presented by the presentation means 510, or be sent to the control center 600, to make possible automatic or manual evaluation of the setting of the parameter weighting. Any erroneous setting for the current driving task can thus be detected and be remedied by changing the settings either automatically from the control center for example or semi-automatically by the vehicle driver.

In an alternative example the simulation process is performed serially, or to a certain extent serially. It is not necessary that this be done even in the physical vicinity of the vehicle. Rather, the process can take place in the control center 600 or in a computer laboratory or the like where computer processing, computer analysis and optimisation work can be carried out. Saved results R1-RN can thus be transferred to the desired physical location, e.g. the control center 600 and be used to obtain a statistical basis for alternative setting of the control parameter weightings for given driving distances and to perform future optimisations of the weighting of the control parameters and/or the driving schedule. Furthermore simulations can be carried out which include values within a hypothetically relevant interval with adequate variation of the actually measured known parameters 330, to achieve a better statistical basis and thus make better optimisation possible of control parameter weighting or setting schedules (described in FIG. 6) for a given stretch of road.

The two above described processes can of course be combined in ways suitable for different situations and purposes. A chosen process is thus not limited to the respective descriptions.

The invention claimed is:

1. A motor vehicle with a clutch (3) and automated transmission (9) between the engine and the drive wheels of the vehicle, comprising control means (45,48) for controlling the engine and for controlling the transmission in accordance with a selected position for an electronic gear selector (46), where the control means, with the gear selector in its position for automatic shifting, upon movement, selects a gear which is determined by a gear setting preference, stored in the control means, as a function of various driving preference parameters fed into the control means, the control means comprising:
   a first simulation of an intended path of the vehicle in response to measured and sensed information (360, 330, 320, 350) for a set of different shift schedules, and select an optimal shift schedule from said set of shift schedules with regards to a first set of weighted driving preference parameters (U1) derived from a weight assigned to each driving preference of the set of the various driving preferences,
   a second simulation of the intended path of the vehicle in response to said measured and sensed information (360, 330, 320, 350) for a set of different shift schedules and select a shift schedule from said set of shift schedules which is optimal with regard to at least one alternative set of weighted driving preference parameters (U2-UN) and,
   a comparative analysis of results (R1-RN) of the first simulation and the second simulation in order to identify the optimal set of the weighted driving preference parameters and an optimal selected shift schedule.

2. The motor vehicle according to claim 1, wherein said control means comprise a first electronic control unit (48) for control of the engine and a second electronic control unit (45) for control of the transmission, both adapted for communication with each other.

3. The motor vehicle according to claim 2, wherein the control means (45,48) are arranged to perform the simulation process for the alternative set of the driving preference parameters (U2-UN) in parallel in real time.

4. The motor vehicle according to claim 2, wherein the control means (45,48) are arranged to perform the simulation process for the alternative set of the driving preference parameters (U2-UN) in series or in parallel, or as a combination thereof.

5. The motor vehicle according to claim 1, wherein the control means (45,48) are arranged to perform the second simulation for the alternative set of the driving preference parameters (U2-UN) in parallel in real time.

6. The motor vehicle according to claim 1, wherein the control means (45,48) are arranged to perform the comparative analysis, which includes an evaluation of the results(R1-RN) of the first simulation and the second simulation, in accordance with a model stored therein.

7. The motor vehicle according to claim 1, wherein the control means (45,48) are arranged to perform the second simulation for the alternative set of the driving preference parameters (U2-UN) in series or in parallel, or as a combination thereof.

8. The motor vehicle according to claim 1, wherein a control center (600) is arranged to perform the second simulation for the alternative set of the driving preference parameters (U2-UN).

9. The motor vehicle according to claim 8, wherein the control center (600) is arranged to automatically update the control parameters and/or a setting schedule in the control means (45,48) based on the results (R1-RN) of the first simulation and the second simulation.

10. The motor vehicle according to claim 1, wherein a memory(710) is arranged for storing the results (R1-RN) of the simulation process.

11. The motor vehicle according to claim 1, wherein presentation means(510) are arranged to present at least one of the results(R1-RN) of the first simulation and the second simulation from the comparative analysis in real time and an evaluation of the same.

12. The motor vehicle according to claim 1, wherein a control center (600) is arranged to receive the results (R1-RN) of the first simulation and the second simulation from a communications terminal (500) and carry out a comparative analysis including an evaluation of the results (R1-RN) of the first simulation and the second simulation for optimization purposes.

13. The motor vehicle according to claim 12, wherein the control center (600) is arranged to automatically update the control parameters and/or a setting schedule in the control means (45,48) based on the results (R1-RN) of the first simulation and the second simulation.

14. The motor vehicle according to claim 13, wherein the setting schedule in the control means can be manually overridden.

15. The motor vehicle according to claim 1, wherein the control center (600) is arranged to automatically update the various driving preference parameters and/or a setting schedule in the control means (45,48) based on the results (R1-RN) of the first simulation and the second simulation.

16. The motor vehicle according to claim 1, characterized in that the control means (45,48) are arranged to automatically update control parameters and/or setting schedules based on the results (R1-RN) of the first simulation and the second simulation.

17. The motor vehicle according to claim 1, wherein the control means (45,48) are arranged to automatically update control parameters and/or setting schedules on the basis of the results(R1-RN) of the first simulation and the second simulation, when a switch (300) is manually set therefore.

* * * * *